No. 879,860. PATENTED FEB. 25, 1908.
G. A. FARRELL.
SPEED BOAT.
APPLICATION FILED JUNE 13, 1907.
2 SHEETS—SHEET 1.
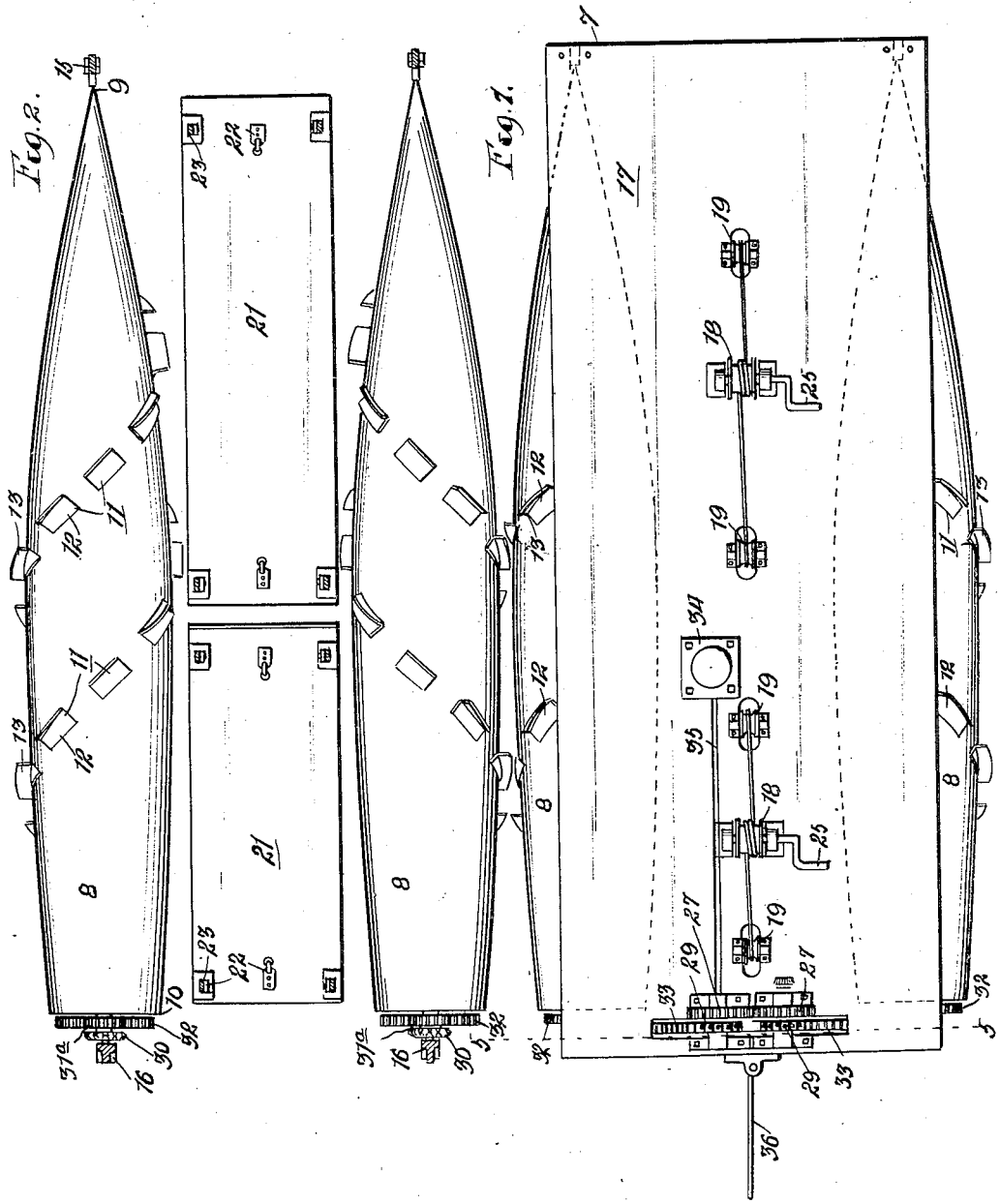
Witnesses
Wm P. Bond
Pierson W. Banning.
Inventor:
George A. Farrell
by Banning & Banning
Attys No. 879,860. PATENTED FEB. 25, 1908.
G. A. FARRELL.
SPEED BOAT.
APPLICATION FILED JUNE 13, 1907.
2 SHEETS—SHEET 2.
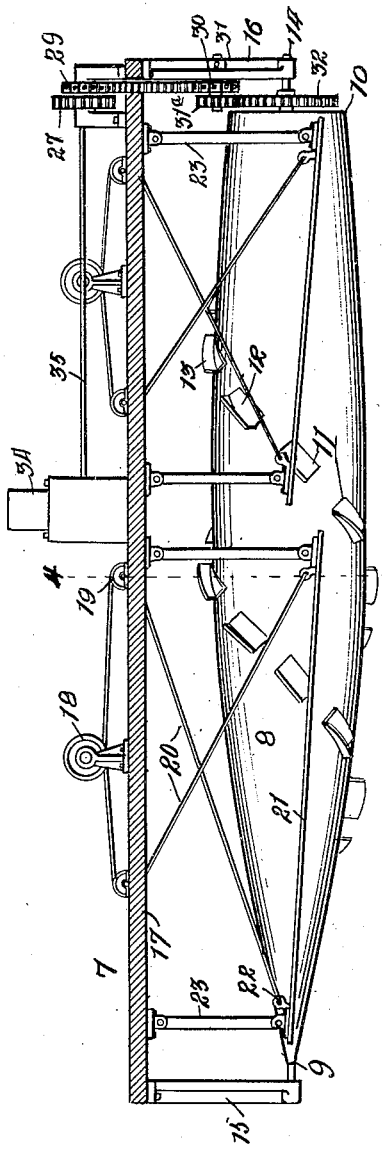
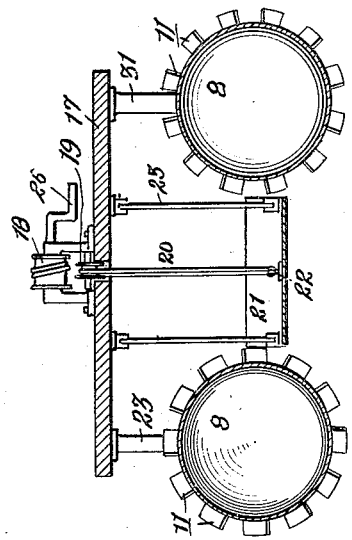
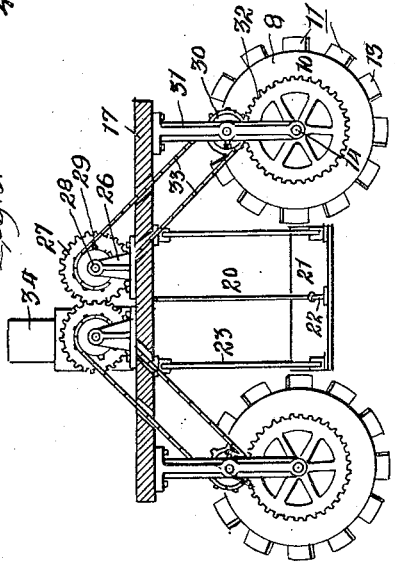
Witnesses
Inventor.
George A. Farrell

UNITED STATES PATENT OFFICE.

GEORGE A. FARRELL, OF CHICAGO, ILLINOIS.

SPEED-BOAT.

No. 879,860.

Specification of Letters Patent.

Patented Feb. 25, 1908.

Application filed June 13, 1907. Serial No. 378,813.

*To all whom it may concern:*

Be it known that I, GEORGE A. FARRELL, a citizen of the United States, residing at Chicago, in the county of Cook and State of Illinois, have invented certain new and useful Improvements in Speed-Boats, of which the following is a specification.

This invention relates to that class of speed or power boats which, in addition to the speed obtained from engines, also utilizes the lifting effect afforded by the use of hydroplanes, which have the tendency to raise the body of the boat considerably out of the water, thus minimizing the resistance.
One object of the invention is to construct the boat, as a whole, from two separate boat bodies, which are adapted to be revolved at a high rate of speed in the water; to suitably secure these bodies together, so as to have spaced between them hydroplanes in close proximity to the surface of the water; and a platform above the hydroplanes for an engine, etc.

Another object is to construct the device in such manner that when the power from an engine is utilized, in combination with the hydroplane, a tremendous speed will be obtained.

Another object is to make the structure as light as possible consistent with safety; and the invention finally consists in the features of construction and combination of parts hereinafter described and claimed.

In the drawings, Figure 1 is a top or plan view of the boat; Fig. 2 a similar view, with the platform removed; Fig. 3 a side interior elevation of one of the boat bodies and platform, showing the means for regulating the hydroplanes; Fig. 4 a transverse section, taken on line 4—4 of Fig. 3; and Fig. 5 a section, taken on line 5—5 of Fig. 1.

The boat 7 comprises a pair of elongated companion tapered bodies 8, which are identical in construction with one another.
They are preferably made cigar-shaped, and have front pointed ends 9 and rear ends 10, which are somewhat larger. Around the periphery of these bodies, and preferably arranged spirally therewith, are a number of fins 11, positioned so as to strike the water at an angle. These fins are made from metal plates, bent so that one part 12 may be suitably riveted, or otherwise secured to the boat body, and the other part 13 will extend upwardly therefrom and be approximately at right angles therewith. Through both ends of these boat bodies extend longitudinal shafts 14 which are rigid with and revolve with the boat bodies, as indicated in Fig. 3, which are journaled within end supports 15 and 16, respectively, and which extend up to and are secured upon the boat platform 17. Upon this boat platform are secured two winding drums 18, as well as pulleys 19, over which cords 20 are adapted to run. Upon the upper side of the hydroplanes 21, and at their ends, are eyelets 22, through which these cords 20 are adapted to pass; it being understood that the ends of the cord are fastened to each end of the hydroplane 21, as shown.

A plurality of hinged supports 23 depend from the boat platform, the same having hinged connections at their lower ends where they are secured to the hydroplanes, so that, by turning the handles or cranks 25 upon the platform, the winding drums 18 will be caused to rotate, and thus raise or lower the hydroplanes as desired.

Positioned in the middle of the platform and at the rear end are mounted, upon supports 26, a pair of spur gear wheels 27, intermeshed with one another and also revolved with axles 28 journaled on the supports 26. A pair of fixed upper sprocket wheels 29 revolve with the axles 28, outside of and adjacent to the spur gear wheels 27. Similar lower sprocket wheels 30 are journaled upon the supports 31, depending from the boat platform, and these also are adapted to actuate pinions 31ª, which in turn intermesh with lower spur gear wheels 32, which revolve with the axles 14, which are journaled at their ends. Sprocket chains 33 are adapted to be positioned over the upper and lower sprocket wheels. From an engine 34, upon the boat platform, extends a shaft 35, which is journaled within the support 26, at the end thereof, and actuates one of the gear wheels 27, thus furnishing suitable power for revolving the other spur gear wheel 27, which intermeshes therewith, and which, it will be observed, causes the boat bodies to revolve in opposite directions outwardly from one another. A rudder 36 is secured to the stern of the boat for guiding the same.

In operation, the engine, having been started, will cause the cigar-shaped bodies to outwardly revolve, making their fins, as before stated, contact the water at an angle.

The hydroplanes are then adjusted. Their forward ends are slightly poised above the water level so that, as the boat speeds through the water, these hydroplanes will cause the body of the boat to skip or shoot over the surface, thus minimizing the resistance, which is most pronounced in boats of this character. It is furthermore obvious that air compartments may be provided for the boat bodies, if desired.

From the foregoing it will be evident that, owing to the instrumentalities employed for speeding the boat, when used in combination with the aforesaid hydroplanes, the boat as a whole will travel over the surface of the water at a very great speed.

What I regard as new and desire to secure by Letters Patent is:

1. In a boat, the combination of a pair of elongated revoluble bodies, a hydroplane adapted to be secured between the bodies, a platform above and secured to the bodies, and means for revolving the elongated bodies to propel the boat, substantially as described.

2. In a boat, the combination of cigar-shaped revoluble bodies, hydroplanes adapted to be secured between the bodies, a platform above the bodies and secured thereto, means for regulating the hydroplanes, and means for revolving the cigar-shaped bodies to propel the boat, substantially as described.

3. In a speed boat, the combination of a pair of cigar-shaped revoluble bodies, a plurality of fins secured to the bodies, a hydroplane adapted to be secured between the bodies, a platform above and secured to the bodies, and means for revolving the elongated bodies to propel the boat, substantially as described.

4. In a speed boat, the combination of a pair of cigar-shaped revoluble bodies, a plurality of fins spirally arranged on the body, hydroplanes adapted to be secured between the bodies, a platform above the bodies and secured thereto, means for regulating the hydroplanes, and means for revolving the cigar-shaped bodies outwardly at a high rate of speed to propel the boat, substantially as described.

5. In a speed boat, the combination of a pair of cigar-shaped revoluble bodies, a plurality of fins spirally arranged on the bodies, hydroplanes adapted to be secured between the bodies, a platform above the bodies and secured thereto, means for regulating the hydroplanes consisting of cords passed through eyelets at the opposite ends of the hydroplanes, the cords being regulated by winding drums upon the boat platform, and means for revolving the cigar-shaped bodies outwardly at a high rate of speed to propel the boat, substantially as described.

6. In a boat, the combination of a pair of elongated revoluble bodies, a longitudinal shaft passing centrally through each of the aforesaid bodies, front and rear braces adapted to secure the elongated bodies to a platform and having their lower ends embrace the longitudinal shafts, a hydroplane adapted to be secured between the bodies, a platform above and secured to the bodies, and means for revolving the elongated bodies to propel the boat, substantially as described.

7. In a boat, the combination of a pair of elongated revoluble bodies, a hydroplane adapted to be secured between the bodies, a platform above and secured to the bodies, a power engine, a shaft leading from the engine to an upper gear wheel, an upper gear wheel, a companion upper gear wheel adapted to intermesh with the first upper gear wheel, a pair of upper sprocket wheels connected to the gear wheels, a pair of lower sprocket wheels, sprocket chains adapted to engage the upper and lower sprocket wheels, and a pair of lower gear wheels connected to the lower sprocket wheels upon the boat bodies, the same adapted to revolve the boat bodies outwardly from one another, substantially as described.

GEORGE A. FARRELL.

Witnesses:
 WALKER BANNING,
 PIERSON W. BANNING.